June 8, 1965  P. W. HARLAND  3,187,572

UNDERWATER GAUGE

Filed June 18, 1962

INVENTOR.
PHILIP W. HARLAND
BY
Robertson ay Smythe
ATTORNEYS.

3,187,572
UNDERWATER GAUGE

Philip W. Harland, Sellersville, Pa., assignor to Ametek, Inc., New York, N.Y., a corporation of Delaware
Filed June 18, 1962, Ser. No. 203,177
5 Claims. (Cl. 73—292)

The present invention relates to depth gauges adapted to be worn by skin divers as well as deep-sea divers and others.

Depth gauges have been provided heretofore having sealed cases within which the depth indicating apparatus is located. Such devices are subject to erroneous readings due to the fact that as the temperature of the gas or air entrapped within the sealed case varies, incorrect readings of depth are indicated.

The principal object of the present invention is to provide a depth gauge adapted to be worn by the divers, such as upon his wrist, in which variations in temperature of the water will not affect the precision of the indicator showing the depth at which the wearer is swimming.

Another object of the invention is to provide a combined temperature and depth gauge in which the operating parts are continuously exposed to the water within which the wearer is swimming.

Still another object of the invention is to provide such a gauge in which a Bourdon tube type of gauge is sealed at each of its ends and is constantly subjected exteriorly to the water within which the gauge is submerged.

Still another object of the invention is to provide such a combination temperature and depth gauge in which a minimum of space is consumed within a casing of such size that it can with facility be worn on the wrist.

Still another object of the invention is to provide such a device in which the case may readily be disassembled and re-assembled to facilitate flushing.

In one aspect of the invention, the base for a transparent casing may include a plurality of spaced bosses of identical height to which a plate may be rigidly but removably attached. The plate may support in depending fashion the stationary end of a Bourdon tube, the free end of which may be attached through the usual linkage to a toothed quadrant fixed to a spindle that may be journaled in aligned bearings within said casing.

In another aspect of the invention, the toothed portion of the quadrant may mesh with a pinion fixed to a spindle journaled in a boss integral with the base for the case, and said spindle may extend upwardly through the plate and have a hand attached to its upper end for movement over a scale on the upper surface of the plate.

In still another aspect of the invention, a bimetallic coiled member may have its one end fixed to a bracket depending from the plate and its opposite end fixed to a spindle journaled in a boss attached to the base of the casing. The spindle may extend above the plate and may support a hand for movement over another scale on the upper surface of the plate.

In still another aspect of the invention, the periphery of the base may have exteriorly grooved flange means adapted to make a snap fit with beaded wall means of the transparent casing. Cam means may be mounted on the base adjacent the grooved flange means such that when turned in one direction, it forces the flange means into locking relation with the beaded wall means of the casing, and when turned in the opposite direction, permits removal of the casing from its base.

In still another aspect of the invention, through passage means may be provided in the base to permit ingress and egress of water to and from the case when the device is submerged. In order to prevent algae and foreign matter from entering the case with the water, screen means may cover the through passage means.

In still another aspect of the invention, an arcuately shaped buckle means may be fixed to the base through which a band may pass for facilitating attachment of the device to the wrist of the wearer.

The above, other objects and novel features of the invention will become apparent from the following specification and accompanying drawing which is merely exemplary.

Figure 1:
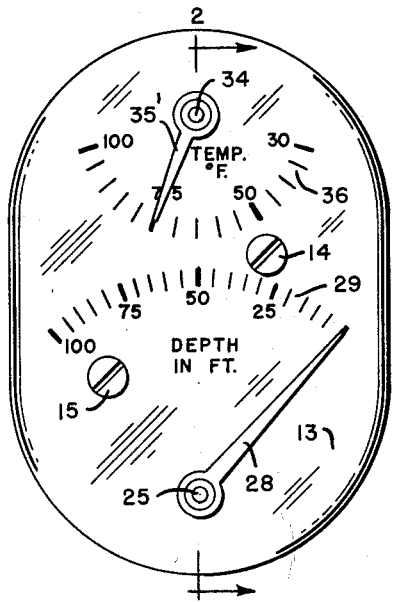
FIG. 1 is a plan view of a combined depth and temperature gauge to which the principles of the invention have been applied.
Figure 4:
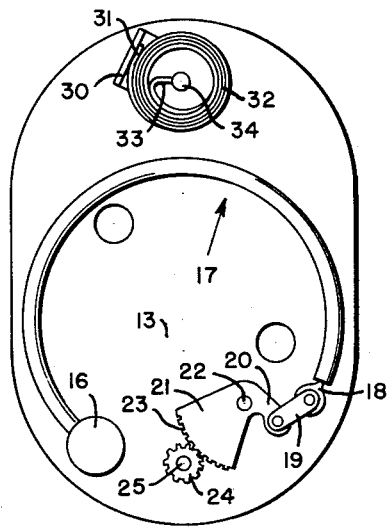
FIG. 4 is a sectional plan view looking in the direction of the arrows, and taken substantially along line 4—4 of FIG. 2.

Referring to the drawing, the principles of the invention are shown as applied to a combined depth and temperature gauge including a base 10 having upwardly extending bosses 11 and 12 of identical height. A plate 13 may be mounted on the top of bosses 11 and 12 and may be removably secured thereto by screws 14 and 15. The stationary end 16 of a Bourdon tube 17 may be rigidly attached to the underside of plate 13. It may be a "dead end" from which the Bourdon tube 17 extends. The free end of tube 17 may be sealed and may include a tip 18 that may be pivotally connected to a link 19, which latter may be pivotally connected to an arm 20 of a quadrant 21.

The quadrant 21 may be fixed to a spindle 22 journaled in aligned bearings within a bracket (not shown) that may be fixed to plate 13. The quadrant 21 may include a toothed portion 23 that meshes with a pinion 24 fixed to a spindle 25. The spindle 25 may be journaled in a bearing within a boss 26 integral with base 10, and another bearing 27 formed in plate 13 and aligned with the bearing in boss 26. The upper end of spindle 25 may have a hand 28 fixed to it for movement across a scale 29 on the top surface of plate 13.

A bracket 30 may be fixed to plate 13, and one end 31 of a coiled, bimetallic member 32 may be fixed to the bracket 30. The opposite end 33 of coiled member 32 may be fixed to a spindle 34 that is journaled in a bearing within a boss 35 integral with base 10. The spindle 34 may extend upwardly through plate 13 and a hand 35' may be fixed to spindle 34 for movement over a scale 36 on the top surface of plate 13.

The base 10, plate 13 and the components mounted therebetween may be encased within a transparent casing 37 having side walls 38. The side walls 38 may include internal, peripheral, beaded means 39 adapted to make a snap connection with grooved, upstanding flange means 40 on the base 10.

Figure 3:
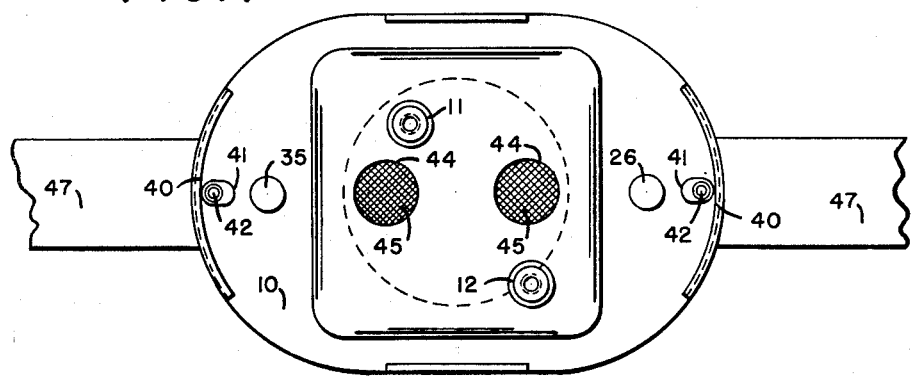
FIG. 3 is a sectional plan view looking in the direction of the arrows, and taken substantially along line 3—3 of FIG. 2.
Figure 2:
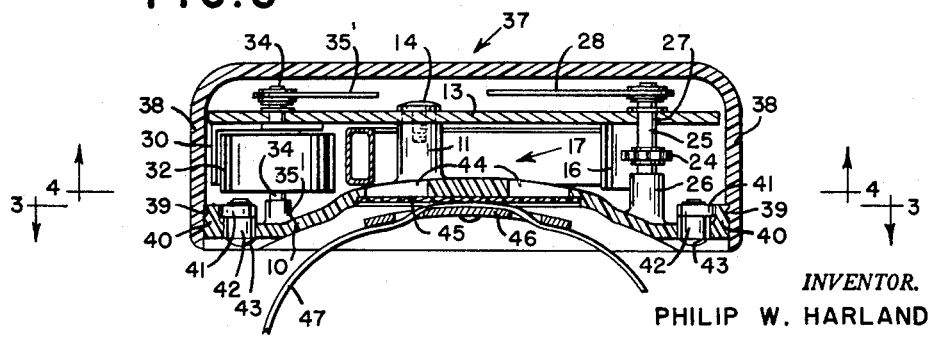
FIG. 2 is a sectional elevational view taken substantially along line 2—2 of FIG. 1.

Cam means 41 may be fixed to rotatable pins 42 mounted in the base 10 adjacent the flange means 40. The pins 42 are provided with a slot 43 for the reception of a coin or similar implement for turning the pins 42. The construction and arrangement of the parts are such that when the cam means 41 are in the position shown in FIG. 2, they lock together the grooved flange means 40 and beaded wall means 39; and when in the position shown in FIG. 3, they permit the unsnapping of the grooved flange means 40 and beaded wall means 39 to facilitate removal of the case 37 from the base 10.

In order to permit free ingress and egress of the water to and from the casing 37, the base 10 may be provided with through passage means 44. Furthermore, to prevent algae and foreign matter from entering the case 37, screen means 45 may cover the passage means 44.

An arcuately shaped, buckle-like member 46 may be fixed to the base 10, and a wristband 47 may be threaded through the member 46 for facilitating the attachment of the device to the wrist of a wearer.

It is desirable to evacuate the Bourdon tube so as to avoid temperature errors.

It is to be understood that the term "adapted to be worn on the wrist" encompasses wearing of the gauge on other parts of the body or carrying thereby.

Although the various features of the invention have been shown and described in detail to fully disclose one embodiment of the invention, it will be evident that changes may be made in such details and certain features may be used without others without departing from the principles of the invention.

What is claimed is:

1. A depth gauge adapted to be worn on the wrist or the like, comprising in combination a base; a plate mounted on said base in spaced relation; pressure-sensitive means of a sealed Bourdon type mounted on said plate and located between said plate and base; indicating means connected to said pressure-sensitive means; a casing surrounding said plate and pressure-sensitive means and making a snap connection with means on said base; temperature-sensitive means within said casing; a second indicating means within said casing and operated by said temperature-sensitive means; means for providing ingress and egress of water to and from within said casing for acting externally on said pressure- and temperature-sensitive means; and means for preventing foreign matter from entering said casing with said water.

2. A depth gauge adapted to be worn on the wrist or the like, comprising in combination a base; a plate mounted on said base in spaced relation; a Bourdon tube having its ends sealed, said Bourdon tube being mounted on said plate between said plate and base; indicating mechanism; multiplying mechanism between the free end of said Bourdon tube and said indicating mechanism; a casing surrounding said plate and Bourdon tube and making a snap connection with means on said base, rotatable cam means for locking said snap connection; and means for providing ingress and egress of water to and from within said casing for acting on said Bourdon tube.

3. A depth gauge adapted to be worn on the wrist or the like, comprising in combination a base; a plate mounted on said base in spaced relation; a Bourdon tube having its ends sealed, said Bourdon tube being mounted on said plate between said plate and base; indicating mechanism; multiplying mechanism between the free end of said Bourdon tube and said indicating mechanism; a casing surrounding said plate and Bourdon tube and making a snap connection with means on said base; rotatable cam means for locking said snap connection; means for providing ingress and egress of water to and from within said casing for acting on said Bourdon tube; and screen means for preventing foreign matter from entering said casing with said water.

4. A depth gauge adapted to be worn on the wrist or the like, comprising in combination a base; a plate mounted on said base in spaced relation; a Bourdon tube having its ends sealed, said Bourdon tube being mounted in said plate between said plate and base; indicating mechanism; multiplying mechanism between the free end of said Bourdon tube and said indicating mechanism; a casing surrounding said plate and Bourdon tube and making a snap connection with means on said base; rotatable cam means for locking said snap connection; a coiled, bimetallic member mounted on said plate and located between said plate and base; indicating means connected to said coiled member; and means for providing ingress and egress of water to and from within said casing for acting on said Bourdon tube and said coiled member.

5. A depth gauge adapted to be worn on the wrist or the like, comprising in combination a base; a plate mounted on said base in spaced relation; a Bourdon tube having its ends sealed, said Bourdon tube being mounted on said plate between said plate and base; indicating mechanism; multiplying mechanism between the free end of said Bourdon tube and said indicating mechanism; a casing surrounding said plate and Bourdon tube and making a snap connection with means on said base; rotatable cam means for locking said snap connection; a coiled, bimetallic member mounted on said plate and located between said plate and base; indicating means connected to said coiled member; means for providing ingress and egress of water to and from within said casing for acting on said Bourdon tube and said coiled member; and screen means for preventing foreign matter from entering said casing with said water.

References Cited by the Examiner

UNITED STATES PATENTS

| 1,588,380 | 6/26 | McCabe | 73—345 |
| 1,941,050 | 12/33 | Punte | 220—60 |
| 2,592,159 | 4/52 | Klebba et al. | 73—300 |
| 2,935,873 | 5/60 | Stewart | 73—300 |
| 3,046,784 | 7/62 | Vicik et al. | 73—300 |

FOREIGN PATENTS

| 798,514 | 3/36 | France. |
| 1,139,379 | 2/57 | France. |

ISAAC LISANN, *Primary Examiner.*

ROBERT L. EVANS, *Examiner.*